(12) United States Patent
Yun et al.

(10) Patent No.: US 11,501,682 B2
(45) Date of Patent: Nov. 15, 2022

(54) FLEXIBLE DISPLAY APPARATUS AND METHOD OF DRIVING DISPLAY PANEL USING THE SAME

(71) Applicant: Samsung Display Co., Ltd., Yongin-Si (KR)

(72) Inventors: Eun Sil Yun, Hwaseong-si (KR); Sangan Kwon, Cheonan-si (KR); Soon-Dong Kim, Osan-si (KR); Taehoon Kim, Hwaseong-si (KR); Changnoh Yoon, Seoul (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 17/321,227

(22) Filed: May 14, 2021

(65) Prior Publication Data
US 2022/0044614 A1 Feb. 10, 2022

(30) Foreign Application Priority Data
Aug. 5, 2020 (KR) .......... 10-2020-0098209

(51) Int. Cl.
G09G 3/00 (2006.01)
G09G 3/20 (2006.01)
(Continued)

(52) U.S. Cl.
CPC ......... G09G 3/2003 (2013.01); G06F 1/1616 (2013.01); G06F 1/1641 (2013.01); G06F 1/1652 (2013.01); G06F 1/1677 (2013.01); G09G 3/035 (2020.08); G09G 3/2007 (2013.01); G09G 3/3291 (2013.01); G09G 2310/027 (2013.01); G09G 2320/0247 (2013.01); G09G 2320/0271 (2013.01);
(Continued)

(58) Field of Classification Search
CPC .... G06F 1/1652; G06F 1/1641; G06F 1/1677; G06F 2203/04102; G06F 2203/04803; G06F 3/04886; G06F 3/035; G06F 1/1616; G06F 1/1618; G06F 3/0484; G06F 3/0416; G09G 2380/02; G09G 2354/00; G09G 3/035; G09G 3/20; G09G 3/2003; G09G 3/2007; G09G 3/3607; G09G 2320/0247; G09G 2320/0673; G09G 2320/0686; G09G 2370/027
See application file for complete search history.

(56) References Cited

U.S. PATENT DOCUMENTS 10,295,848 B2 * 5/2019 Kim ...................... G02F 1/0123
10,339,848 B2 * 7/2019 Park ..................... G09G 3/2007
(Continued)

FOREIGN PATENT DOCUMENTS

KR 10-2019-0058995 A 5/2019

Primary Examiner — Dismery Mercedes
(74) Attorney, Agent, or Firm — Innovation Counsel LLP

(57) ABSTRACT

A flexible display apparatus includes a first body portion, a second body portion and a driving controller. The first body portion includes a first display area, and the second body portion includes a second display area. The second display area is connected to the first display area. The driving controller is configured to determine a first driving frequency of the first display area and a second driving frequency of the second display area based on a folded angle between the first body portion and the second body portion along a folded line disposed between the first body portion and the second body portion.

20 Claims, 10 Drawing Sheets

(51) Int. Cl.
  *G09G 3/3291* (2016.01)
  *G06F 1/16* (2006.01)
(52) U.S. Cl.
  CPC .............. *G09G 2320/0285* (2013.01); *G09G 2320/0673* (2013.01); *G09G 2320/0686* (2013.01)

(56) References Cited

U.S. PATENT DOCUMENTS

| | | | |
|---|---|---|---|
| 11,004,399 B2* | 5/2021 | Park | G09G 3/3275 |
| 11,049,451 B2* | 6/2021 | Park | G09G 3/3266 |
| 11,107,422 B2* | 8/2021 | Lee | G09G 3/325 |
| 2007/0139355 A1* | 6/2007 | Ryuh | B60K 35/00 |
| | | | 345/103 |
| 2008/0297538 A1* | 12/2008 | Cho | G09G 3/3655 |
| | | | 345/690 |
| 2013/0038621 A1* | 2/2013 | Choi | G09G 3/3406 |
| | | | 345/589 |
| 2014/0101535 A1* | 4/2014 | Kim | G06F 1/1641 |
| | | | 715/761 |
| 2015/0248149 A1* | 9/2015 | Yamazaki | G06F 1/1652 |
| | | | 361/679.27 |
| 2016/0184700 A1* | 6/2016 | Lee | G06F 3/04883 |
| | | | 463/31 |
| 2016/0351103 A1* | 12/2016 | Park | G09G 3/2007 |
| 2020/0119432 A1* | 4/2020 | Mizunuma | H01Q 1/243 |
| 2020/0357362 A1* | 11/2020 | Shin | G09G 3/035 |
| 2020/0394984 A1* | 12/2020 | Park | G09G 3/3266 |

\* cited by examiner

FIG. 12

| STAGE | INPUT GRAYSCALE VALUE (8bits) | FLICKER VALUE | FREQUENCY(Hz) |
|---|---|---|---|
| 1 | 0-3 | 0 | 1 |
| 2 | 4-7 | 0 | 1 |
| 3 | 8-11 | 40 | 2 |
| 4 | 12-15 | 80 | 5 |
| 5 | 16-19 | 120 | 10 |
| 6 | 20-23 | 160 | 30 |
| 7 | 24-27 | 200 | 60 |
| ⋮ | ⋮ | ⋮ | ⋮ |
| 60 | 236-239 | 0 | 1 |
| 61 | 240-243 | 0 | 1 |
| 62 | 244-247 | 0 | 1 |
| 63 | 248-251 | 0 | 1 |
| 64 | 252-255 | 0 | 1 |

| SEG11 | SEG12 | SEG13 | SEG14 | SEG15 |
|-------|-------|-------|-------|-------|
| SEG21 | SEG22 | SEG23 | SEG24 | SEG25 |
| SEG31 | SEG32 | SEG33 | SEG34 | SEG35 |
| SEG41 | SEG42 | SEG43 | SEG44 | SEG45 |
| SEG51 | SEG52 | SEG53 | SEG54 | SEG55 |
| SEG61 | SEG62 | SEG63 | SEG64 | SEG65 |
| SEG71 | SEG72 | SEG73 | SEG74 | SEG75 |
| SEG81 | SEG82 | SEG83 | SEG84 | SEG85 |

FLEXIBLE DISPLAY APPARATUS AND METHOD OF DRIVING DISPLAY PANEL USING THE SAME

PRIORITY STATEMENT

This application claims priority under 35 U.S.C. § 119 to Korean Patent Application No. 10-2020-0098209, filed on Aug. 5, 2020 in the Korean Intellectual Property Office KIPO, the contents of which are herein incorporated by reference in their entireties.

BACKGROUND

1. Field

The present disclosure relates to a flexible display apparatus and a method of driving a display panel using the flexible display apparatus. More particularly, the present disclosure relates to a flexible display apparatus reducing power consumption and enhancing display quality of a display panel and a method of driving a display panel using the flexible display apparatus.

2. Description of the Related Art

Generally, a display apparatus includes a display panel and a display panel driver. The display panel includes a plurality of gate lines, a plurality of data lines and a plurality of pixels. The display panel driver includes a gate driver, a data driver and a driving controller. The gate driver outputs gate signals to the gate lines. The data driver outputs data voltages to the data lines. The driving controller controls the gate driver and the data driver.

A foldable display apparatus have been developed using a maximized flexible characteristic of a flexible display panel. The foldable display apparatus may have at least two display areas. The display areas may be formed in a single flexible display panel.

A method to minimize a power consumption of an IT product such as a tablet PC, a note PC and a smart phone have been studied. Usage time of the IT product may decrease due to the power consumption of the display panel. Thus, there is need to develop a novel display device which can reduce power consumption and enhance display quality of a display panel simultaneously.

SUMMARY

Example embodiments of the present disclosure provide a flexible display apparatus capable of reducing a power consumption and enhancing a display quality of a display panel.

Example embodiments of the present disclosure also provide a method of driving a display panel using the flexible display apparatus.

In an example embodiment of a flexible display apparatus according to the present disclosure, the flexible display apparatus includes a first body portion, a second body portion and a driving controller. The first body portion includes a first display area. The second body portion includes a second display area. The second display area is connected to the first display area. The driving controller is configured to determine a first driving frequency of the first display area and a second driving frequency of the second display area based on a folded angle between the first body portion and the second body portion along a folded line disposed between the first body portion (first display area) and the second body portion (second display area).

In an example embodiment, when the folded angle is equal to or less than a threshold angle, the first driving frequency may be different from the second driving frequency.

In an example embodiment, when the folded angle is equal to or less than a threshold angle, and the second body portion contacts a ground, the first driving frequency may be an input frequency of input image data, and the second driving frequency may be a low driving frequency less than the input frequency.

In an example embodiment, when the folded angle is greater than a threshold angle, the first driving frequency may be equal to the second driving frequency.

In an example embodiment, when the folded angle is greater than a threshold angle, the first driving frequency and the second driving frequency may be an input frequency of input image data.

In an example embodiment, the threshold angle may be about 90 degrees.

In an example embodiment, the driving controller may include a static image determiner configured to determine whether input image data represents a static image or a moving image and a driving frequency determiner configured to determine the first driving frequency and the second driving frequency based on the folded angle and configured to determine whether the input image data represents the static image or the moving image.

In an example embodiment, the driving controller may further include a flicker value storage including a flicker value representing a flicker generating degree according to a grayscale value of the input image data. The driving frequency determiner may be configured to determine the first driving frequency and the second driving frequency based on the folded angle, the flicker value, and whether the input image data represents the static image or the moving image.

In an example embodiment, the input image data may be divided into a plurality of segments. The driving frequency determiner may be configured to determine the first driving frequency and the second driving frequency based on the folded angle, whether the input image data represents the static image or the moving image, the flicker value, and a segment information of the input image data.

In an example embodiment, the driving frequency determiner may be configured to determine optimal driving frequencies for the segments of the input image data. The driving frequency determiner may be configured to determine the first driving frequency and the second driving frequency based on a maximum driving frequency among the optimal driving frequencies for the segments.

In an example embodiment, when the folded angle is equal to or less than a threshold angle, and the second body portion contacts the ground, the driving frequency determiner may be configured to determine the first driving frequency based on whether a first input image data corresponding to the first display area represents the static image or the moving image and the flicker value of the first input image data and the second driving frequency as a predetermined low driving frequency.

In an example embodiment, when the folded angle is greater than a threshold angle, the driving frequency determiner may be configured to determine the first driving frequency based on whether first input image data corresponding to the first display area represent the static image or the moving image and the flicker value of the first input image data and the second driving frequency based on whether second input image data corresponding to the second display area represent the static image or the moving image and the flicker value of the second input image data.

In an example embodiment, the flexible display apparatus may further include a sensor configured to determine the folded angle between the first body portion and the second body portion and to determine whether the first body portion is closer to a ground than the second body portion, or the second body portion is closer to the ground than the first body portion.

In an example embodiment, the flexible display apparatus may further include a host configured to receive the folded angle and a proximity information representing whether the first body portion is closer to the ground than the second body portion, or the second body portion is closer to the ground than the first body portion from the sensor and configured to transmit the folded angle and the proximity information to the driving controller.

In an example embodiment of a method of driving a display panel according to the present disclosure, the method includes steps of determining a first driving frequency of a first display area and a second driving frequency of a second display area based on a folded angle of a first body portion including the first display area and a second body portion including the second display area connected to the first display area, displaying a first image on the first display area in the first driving frequency and displaying a second image on the second display area in the second driving frequency.

In an example embodiment, when the folded angle is equal to or less than a threshold angle, the first driving frequency may be different from the second driving frequency.

In an example embodiment, when the folded angle is equal to or less than a threshold angle, and the second body portion contacts a ground, the first driving frequency may be an input frequency of input image data, and the second driving frequency may be a low driving frequency less than the input frequency.

In an example embodiment, when the folded angle is greater than a threshold angle, the first driving frequency may be equal to the second driving frequency.

In an example embodiment, when the folded angle is greater than a threshold angle, the first driving frequency and the second driving frequency may be an input frequency of input image data.

In an example embodiment, the threshold angle may be about 90 degrees.

According to the flexible display apparatus and the method of driving the display panel using the flexible display apparatus, the driving frequencies of the first display area and the second display area may be determined based on the folded angle of the first body portion including the first display area and the second body portion including the second display area. Thus, when it is predicted that the user could not see at least a portion of the first display area or a portion of the second display area since the folded angle of the first body portion and the second body portion is small, the predicted area where the user could not see may be driven in a minimum frequency so that the power consumption of the display apparatus may be reduced.

In addition, a driving frequency of a predicted area where the user could see may be determined using whether the display area displays a static image or a moving image and a flicker value of the image on the display panel so that the power consumption of the display apparatus may be reduced and the flicker of the image may be prevented and thus, the display quality of the display panel may be enhanced.

BRIEF DESCRIPTION OF THE DRAWINGS

The above and other features and advantages of the present disclosure will become more apparent by describing in detailed example embodiments thereof with reference to the accompanying drawings, in which:

FIG. 12 is a table illustrating an example of a flicker value storage of FIG. 11;

DETAILED DESCRIPTION

Hereinafter, the present disclosure will be explained in detail with reference to the accompanying drawings.

Figure 1:
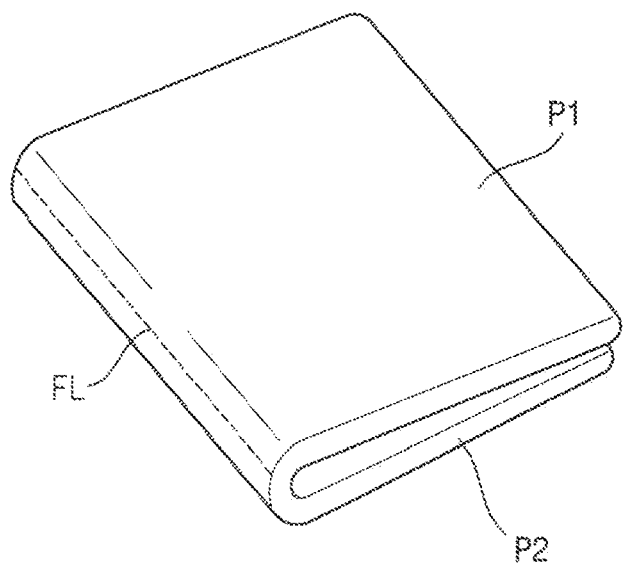
FIG. 1 is a perspective view illustrating a display apparatus according to an example embodiment of the present disclosure.
Figure 2:
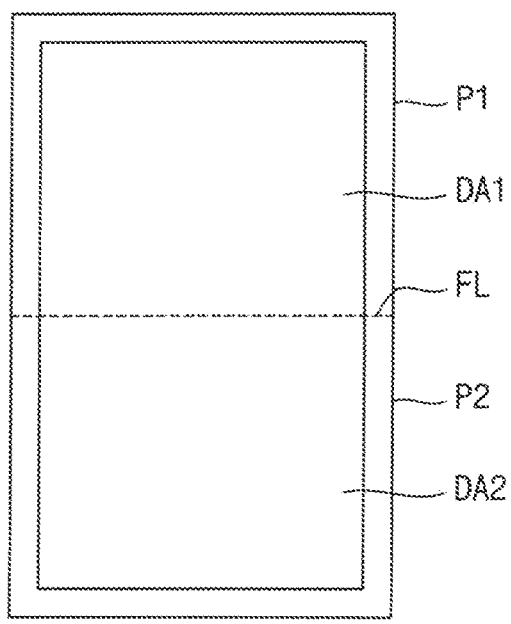
FIG. 2 is a plan view illustrating the display apparatus of FIG. 1.

FIG. 1 is a perspective view illustrating a display apparatus according to an example embodiment of the present disclosure. FIG. 2 is a plan view illustrating the display apparatus of FIG. 1.

Referring to FIGS. 1 and 2, the display apparatus may include a flexible display panel. The display apparatus may be a flexible display apparatus. The display apparatus may be a foldable display apparatus. The display apparatus may be folded along a folding line FL.

The display apparatus may include a first display area DA1 disposed in a first side of the folding line FL and a second display area DA2 disposed in a second side of the folding line FL. The first display area DA1 and the second display area DA2 may be connected to each other.

The display apparatus may include a first body portion P1 including the first display area DA1 and a second body portion P2 including the second display area DA2.

The first display area DA1 and the second display area DA2 may be used to display a single and continuous image as a single display panel. Alternatively, the first display area DA1 and the second display area DA2 may display two different images respectively. The first display area DA1 and the second display area DA2 may display symmetric images with respect to the folding line FL.

Although the folding line FL is disposed at a central portion of the display panel 100 and the size of the first display area DA1 is same as the size of the second display area DA2 in the present example embodiment, the present disclosure may not be limited thereto. Alternatively, the folding line FL may not be disposed at the central portion of the display panel 100 so that the size of the first display area DA1 may be different from the size of the second display area DA2. That is, the first display area DA1 is larger than that of the second display area DA2 or vice versa.

In addition, although the number of the folding line FL is one and the number of the display areas DA1 and DA2 defined by the folding line FL is two in the present example embodiment, the present disclosure may not be limited thereto. The number of the folding line FL may be equal to or greater than two and the number of the display areas DA1 and DA2 defined by the folding lines FL may be equal to or greater than three.

Figure 3A:
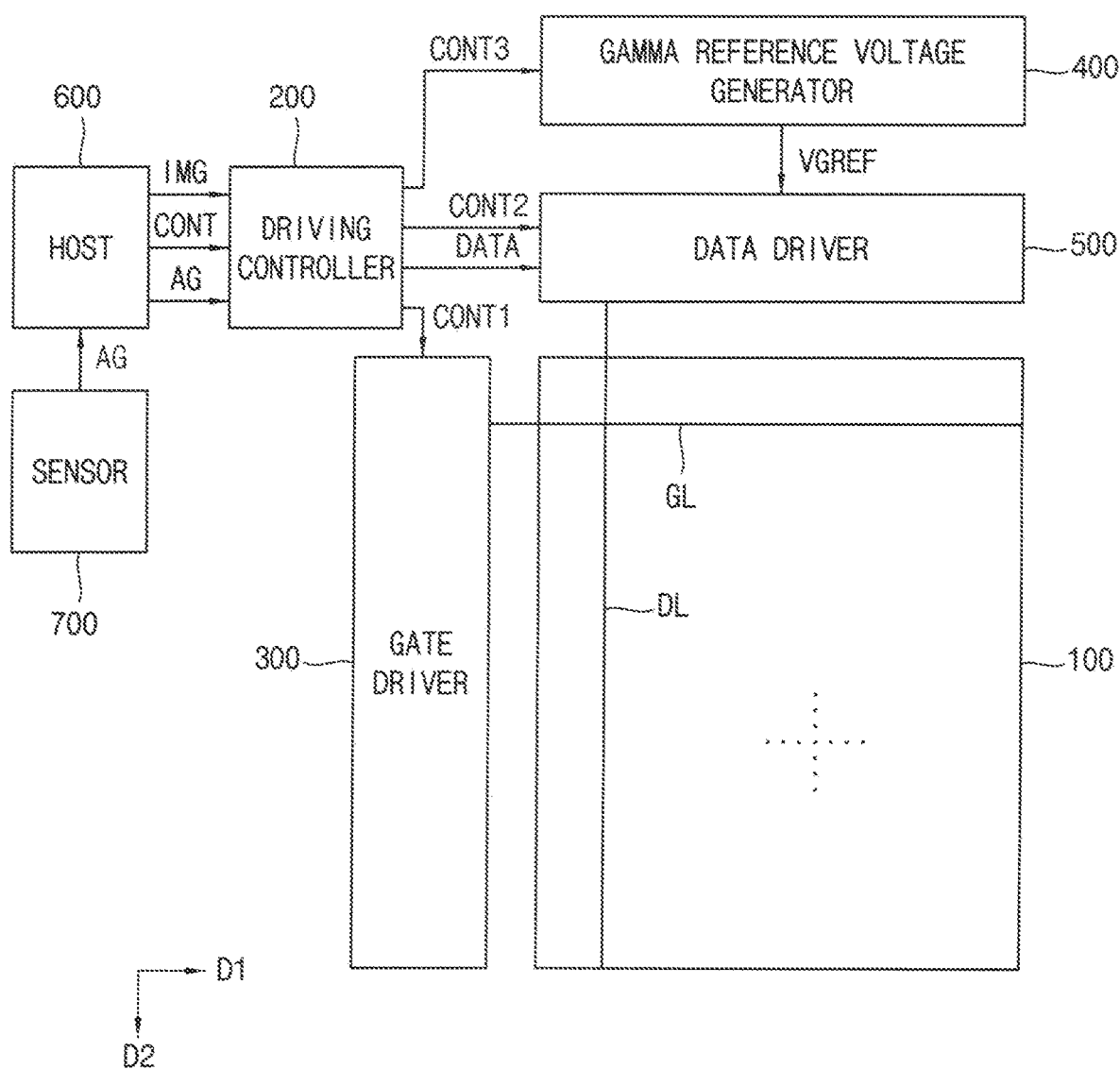
FIG. 3A is a block diagram illustrating the display apparatus of FIG. 1.

FIG. 3A is a block diagram illustrating the display apparatus of FIG. 1.

Referring to FIGS. 1, 2, and 3A, the display apparatus includes a display panel 100 and a display panel driver. The display panel driver includes a driving controller 200, a gate driver 300, a gamma reference voltage generator 400 and a data driver 500. The display apparatus may further include a host 600 and a sensor 700.

For example, the driving controller 200 and the data driver 500 may be integrally formed. For example, the driving controller 200, the gamma reference voltage generator 400 and the data driver 500 may be integrally formed. A driving module including at least the driving controller 200 and the data driver 500 which are integrally formed may be called to a timing controller embedded data driver (TED).

The display panel driver may further include an emission driver outputting an emission signal to the display panel 100. The display panel driver may further include a power voltage generator providing a power voltage to at least one of the display panel 100, the driving controller 200, the gate driver 300, the gamma reference voltage generator 400, and the data driver 500.

The display panel 100 has a display region on which an image is displayed and a peripheral region adjacent to the display region.

The display panel 100 includes a plurality of gate lines GL, a plurality of data lines DL and a plurality of pixels connected to the gate lines GL and the data lines DL. The gate lines GL extend in a first direction D1, and the data lines DL extend in a second direction D2 crossing the first direction D1.

The driving controller 200 receives input image data IMG and an input control signal CONT from the host 600. For example, the input image data IMG may include red image data, green image data and blue image data. For example, the input image data IMG may include white image data. For example, the input image data IMG may include magenta image data, yellow image data and cyan image data. The input control signal CONT may include a master clock signal and a data enable signal. The input control signal CONT may further include a vertical synchronizing signal and a horizontal synchronizing signal.

In the present example embodiment, the driving controller 200 may receive an angle information AG representing a folded angle of the first body portion P1 and the second body portion P2 from the host 600.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

For example, the driving controller 200 may determine a driving frequency of the display panel 100 based on the folded angle and the input image data IMG.

The driving controller 200 generates the third control signal CONT3 for controlling an operation of the gamma reference voltage generator 400 based on the input control signal CONT, and outputs the third control signal CONT3 to the gamma reference voltage generator 400.

A structure and an operation of the driving controller 200 are explained referring to FIGS. 4, 5, 6, 7, 8, 9, and 10 later.

The gate driver 300 generates gate signals driving the gate lines GL in response to the first control signal CONT1 received from the driving controller 200. The gate driver 300 outputs the gate signals to the gate lines GL. For example, the gate driver 300 may sequentially output the gate signals to the gate lines GL. For example, the gate driver 300 may be mounted on the peripheral region of the display panel 100. For example, the gate driver 300 may be integrated on the peripheral region of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an example embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL. For example, the data driver 500 may be mounted on the peripheral region of the display panel 100. For example, the data driver 500 may be integrated on the peripheral region of the display panel 100.

The sensor 700 may determine the folded angle of the first body portion P1 and the second body portion P2. In addition, the sensor 700 may determine whether the first body portion P1 is closer to a ground than the second body portion P2, or the second body portion P2 is closer to the ground than the first body portion P1. The sensor 700 may output the folded angle and a proximity information representing whether the first body portion P1 is closer to the ground than the second body portion P2, or the second body portion P2 is closer to the ground than the first body portion P1. The sensor 700 may include at least one of an angle sensor, a bending sensor, a gyro sensor, a proximity sensor and a lidar sensor.

The host 600 may output the input image data IMG and the input control signal CONT to the driving controller 200. The host 600 may receive the angle information AG including the folded angle and the proximity information from the sensor 700 and transmit the angle information AG to the driving controller 200. The host 600 may be referred to a set or a processor.

Figure 3B:
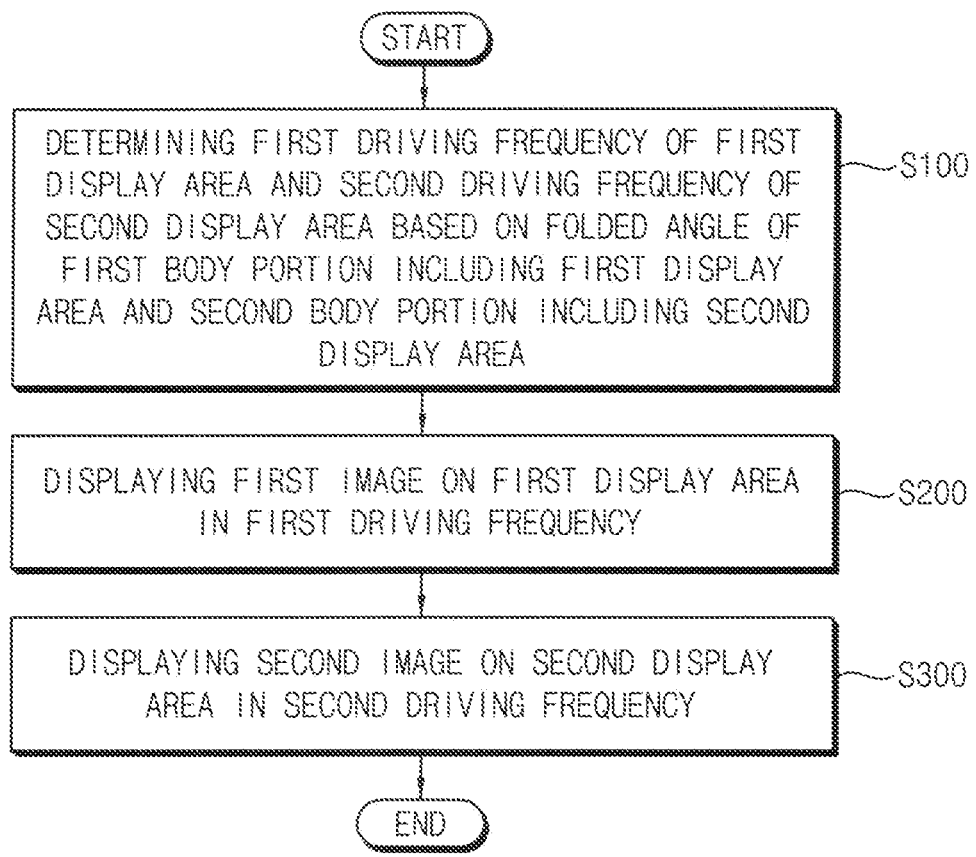
FIG. 3B is a flowchart diagram illustrating a method of driving the display panel of FIG. 3A.
Figure 4:
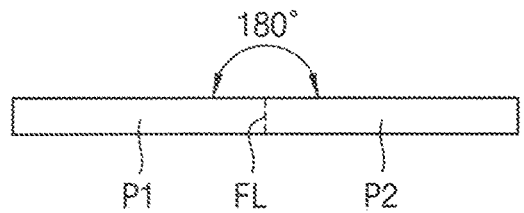
FIG. 4 is a conceptual diagram illustrating a first body portion and a second body portion of the display apparatus of FIG. 1 when a folded angle of the first body portion and the second body portion is about 180 degrees.
Figure 5:
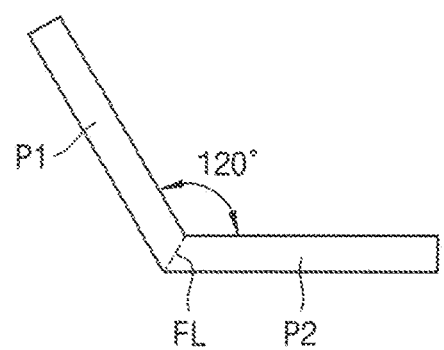
FIG. 5 is a conceptual diagram illustrating the first body portion and the second body portion of the display apparatus of FIG. 1 when the folded angle of the first body portion and the second body portion is about 120 degrees.
Figure 6:
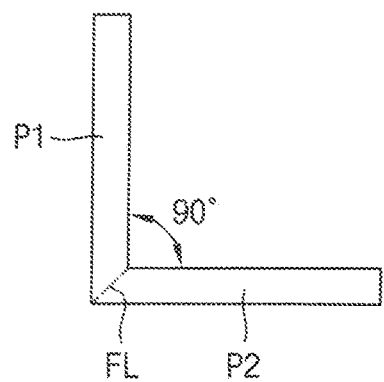
FIG. 6 is a conceptual diagram illustrating the first body portion and the second body portion of the display apparatus of FIG. 1 when the folded angle of the first body portion and the second body portion is about 90 degrees.
Figure 7:
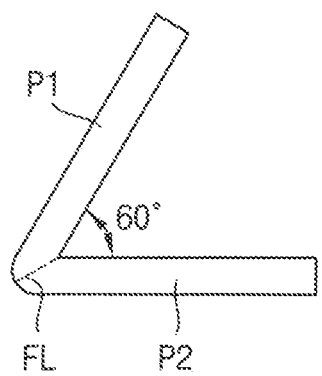
FIG. 7 is a conceptual diagram illustrating the first body portion and the second body portion of the display apparatus of FIG. 1 when the folded angle of the first body portion and the second body portion is about 60 degrees.

FIG. 3B is a flowchart diagram illustrating a method of driving the display panel 100 of FIG. 3A. FIG. 4 is a conceptual diagram illustrating the first body portion P1 and the second body portion P2 of the display apparatus of FIG. 1 when the folded angle of the first body portion P1 and the second body portion P2 is about 180 degrees. FIG. 5 is a conceptual diagram illustrating the first body portion P1 and the second body portion P2 of the display apparatus of FIG. 1 when the folded angle of the first body portion P1 and the second body portion P2 is about 120 degrees. FIG. 6 is a conceptual diagram illustrating the first body portion P1 and the second body portion P2 of the display apparatus of FIG. 1 when the folded angle of the first body portion P1 and the second body portion P2 is about 90 degrees. FIG. 7 is a conceptual diagram illustrating the first body portion P1 and the second body portion P2 of the display apparatus of FIG. 1 when the folded angle of the first body portion P1 and the second body portion P2 is about 60 degrees.

Referring to FIGS. 1, 2, 3A, 3B, 4, 5, 6, and 7, the driving controller 200 may determine a first driving frequency of the first display area DA1 and a second driving frequency of the second display area DA2 based on the folded angle formed by the first body portion P1 and the second body portion P2 (operation S100).

A first image may be displayed on the first display area DA1 in the first driving frequency (operation S200). A second image may be displayed on the second display area DA2 in the second driving frequency (operation S300).

For example, when the folded angle is equal to or less than a threshold angle, the first driving frequency may be different from the second driving frequency. The threshold angle may mean an angle at which it is difficult for a user to see at least one of the first display area DA1 and the second display area DA2.

For example, when the folded angle is equal to or less than the threshold angle, and the second body portion P2 contacts the ground, the first driving frequency may be an input frequency of the input image data IMG, and the second driving frequency may be a low driving frequency less than the input frequency. For example, the input frequency may be 120 Hz, and the low driving frequency may be 1 Hz. Alternatively, the input frequency may be 60 Hz or 240 Hz. The low driving frequency may be determined among frequencies less than the input frequency. For example, the low driving frequency may be 10 Hz, 5 Hz, or 2 Hz.

When the folded angle of the first body portion P1, and the second body portion P2 is equal to or less than the threshold angle, one of the first display area DA1 and the second display area DA2 may be an area having low possibility to be seen to the user. In addition, the area having low possibility to be seen to the user may be the area which is closer to the ground.

For example, the threshold angle may be about 90 degrees. As shown in FIG. 6, when the folded angle of the first body portion P1 and the second body portion P2 is equal to the threshold angle of about 90 degrees, and the second body portion P2 contacts the ground, it is determined that the user mainly sees the first display area DA1 among the first display area DA1 of the first body portion P1 and the second display area DA2 of the second body portion P2, and the second display area DA2 may be the area having low possibility to be seen to the user.

When the folded angle of the first body portion P1 and the second body portion P2 is equal to the threshold angle of about 90 degrees, the user may see the first display area DA1, and the user may use the second display area DA2 as a keyboard input means.

Unlike FIG. 6, when the folded angle of the first body portion P1 and the second body portion P2 is equal to the threshold angle of about 90 degrees, and the first body portion P1 contacts the ground, it is determined that the user mainly sees the second display area DA2 among the first display area DA1 of the first body portion P1 and the first display area DA1 of the second body portion P2 and the first display area DA1 may be the area having low possibility to be seen to the user. In this case, the first driving frequency may be the low driving frequency less than the input frequency and the second driving frequency may be the input frequency of the input image data IMG.

As shown in FIG. 7, when the folded angle of the first body portion P1 and the second body portion P2 is about 60 degrees which is less than the threshold angle of 90 degrees, and the second body portion P2 contacts the ground, it is determined that the user mainly sees the second display area DA2 among the first display area DA1 of the first body portion P1, and the second display area DA2 of the second body portion P2 and the first display area DA1 may be the area having low possibility to be seen to the user.

In FIGS. 6 and 7, the driving frequency of the display area having low possibility to be seen to the user (e.g. DA2 in FIG. 6 and DA1 in FIG. 7) may be set to the low driving frequency less than the input frequency of the input image data IMG so that the power consumption of the display apparatus may be reduced.

When the folded angle is greater than the threshold angle, the first driving frequency may be same as the second driving frequency. When the folded angle is greater than the threshold angle, the first driving frequency and the second driving frequency may be the input frequency of the input image data IMG.

For example, the threshold angle may be about 90 degrees. As shown in FIG. 4, when the folded angle of the first body portion P1 and the second body portion P2 is about 180 degrees which is greater than the than the threshold angle of 90 degrees, it is determined that the user sees both the first display area DA1 of the first body portion P1 and the second display area DA2 of the second body portion P2.

Similarly, as shown in FIG. 5, when the folded angle of the first body portion P1 and the second body portion P2 is about 120 degrees which is greater than the than the threshold angle of 90 degrees, it is determined that the user sees both the first display area DA1 of the first body portion P1 and the second display area DA2 of the second body portion P2.

In FIGS. 4 and 5, the driving frequencies of the display areas DA1 and DA2 having high possibility to be seen to the user may be set to the input frequency so that the display quality of the display panel may not be decreased.

In FIGS. 4, 5, 6, and 7, for example, the threshold angle is about 90 degrees. The threshold angle may mean an angle for determining that the user is difficult to see one of the first display area DA1 and the second display area DA2. Alternatively, the threshold angle is set to be greater than 90 degrees or less than 90 degrees according to a using type of the flexible display apparatus.

Figure 8:
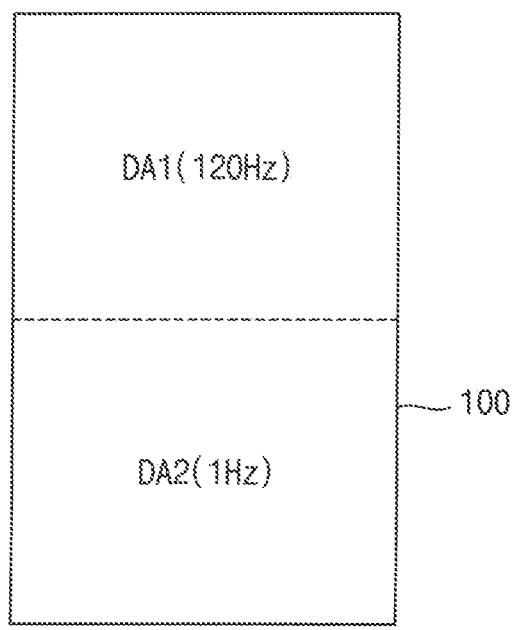
FIG. 8 is a conceptual diagram illustrating a first display area and a second display area of FIG. 2 when the first display area is driven in 120 Hz and the second display area is driven in 1 Hz.
Figure 9:
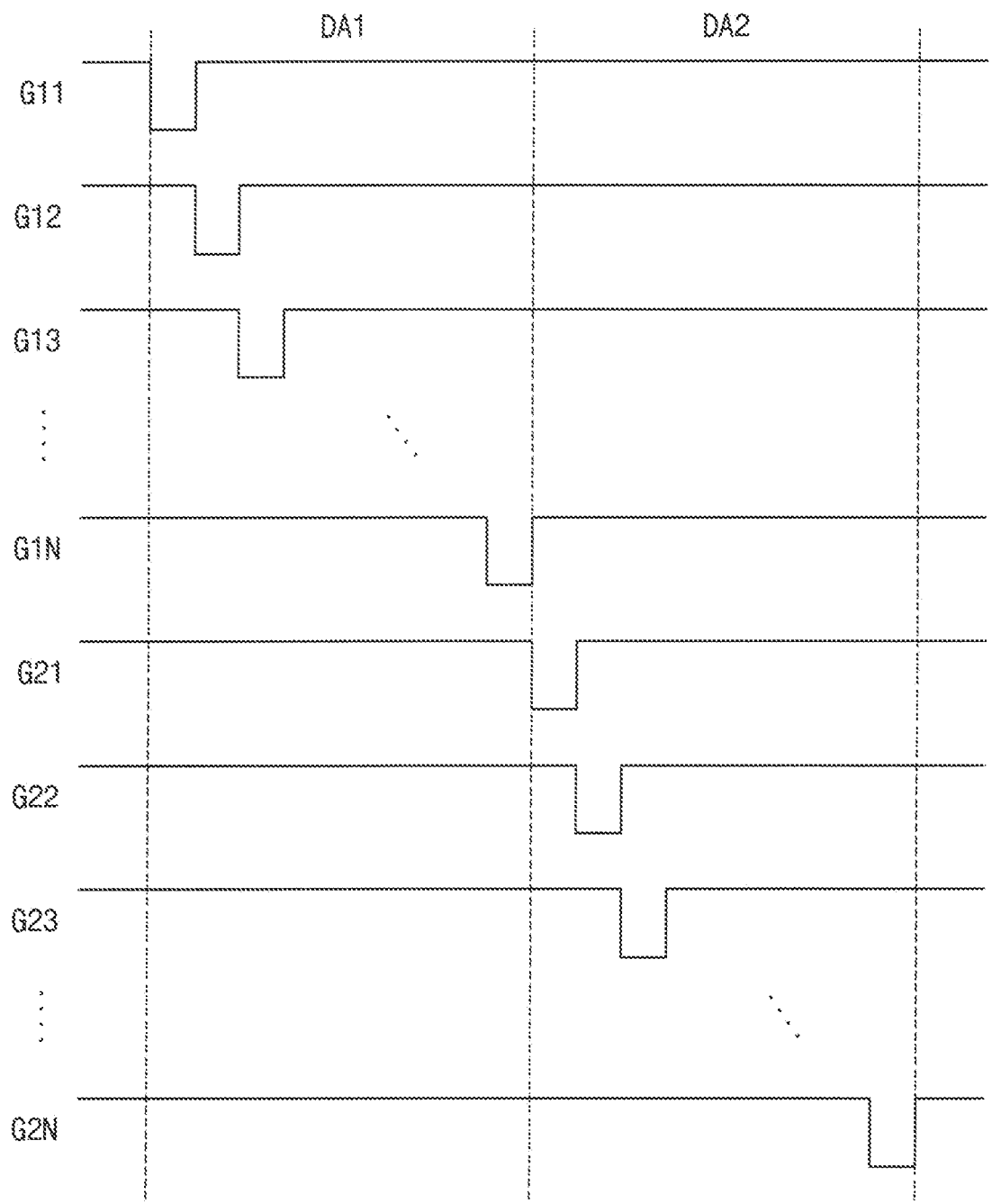
FIG. 9 is a timing diagram illustrating gate signals outputted by a gate driver in a first frame in a case of FIG. 8.
Figure 10:
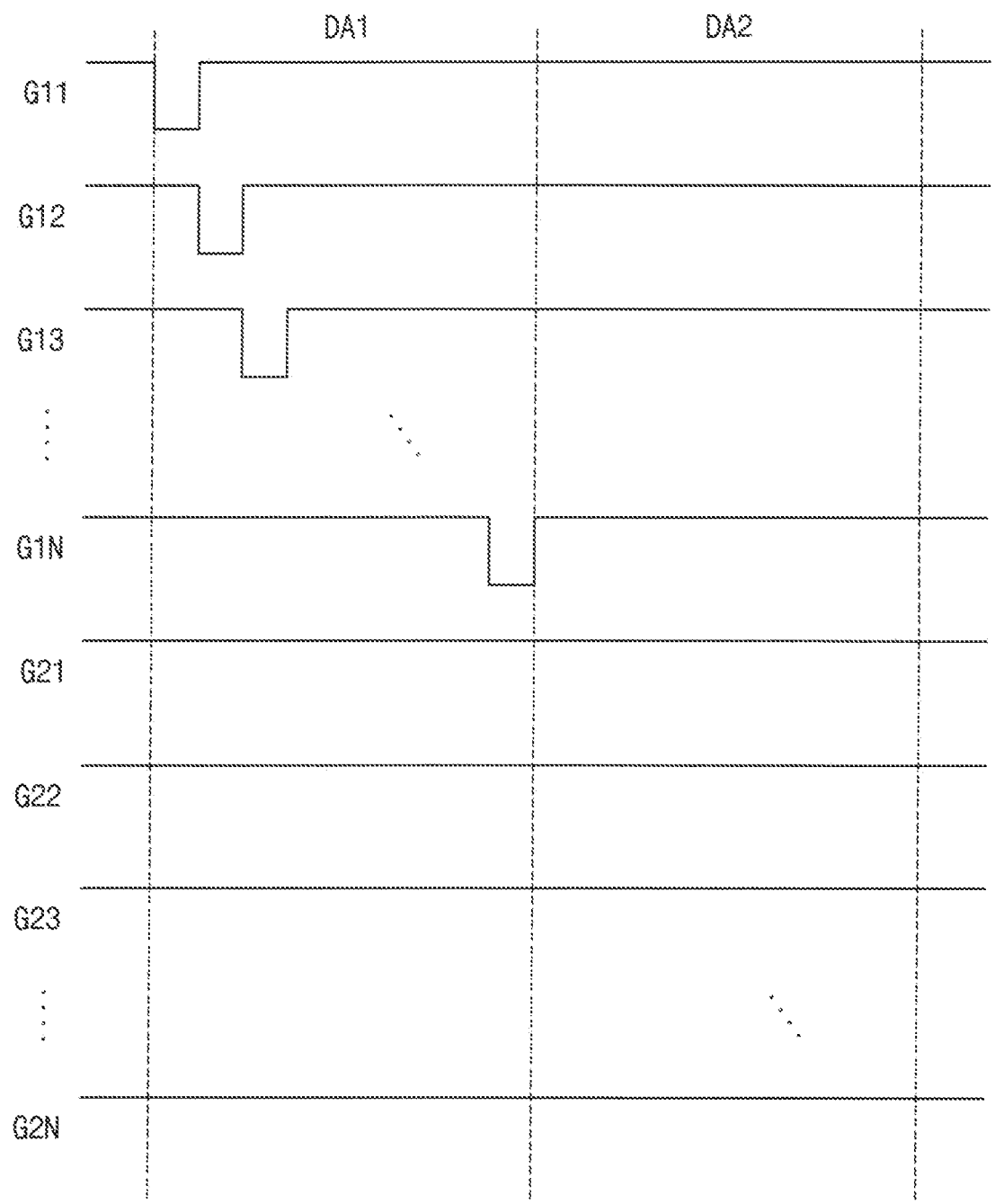
FIG. 10 is a timing diagram illustrating gate signals outputted by the gate driver in a second frame in the case of FIG. 8.

FIG. 8 is a conceptual diagram illustrating the first display area DA1 and the second display area DA2 of FIG. 2 when the first display area DA1 is driven in 120 Hz and the second display area DA2 is driven in 1 Hz. FIG. 9 is a timing diagram illustrating gate signals outputted by the gate driver 300 in a first frame in a case of FIG. 8. FIG. 10 is a timing diagram illustrating gate signals outputted by the gate driver 300 in a second frame in the case of FIG. 8.

Referring to FIGS. 1, 2, 3A, 3B, 4, 5, 6, 7, 8, 9, and 10, for example, the driving controller 200 may set the first driving frequency of the first display area DA1 of the display panel 100 to be 120 Hz, and the second driving frequency of the second display area DA2 of the display panel 100 to be 1 Hz.

The gate driver 300 may output a first gate signal group G11 to G1N corresponding to the first display area DA1 and a second gate signal group G21 to G2N corresponding to the second display area DA2.

The gate driver 300 may inactivate an output of at least one of the first gate signal group G11 to G1N and the second gate signal group G21 to G2N based on the first driving frequency and the second driving frequency.

For example, when the first frequency of the first display area DA1 is 120 Hz and the second frequency of the second display area DA2 is 1 Hz, the first display area DA1 may have 120 writing frames in a second and the second display area DA2 may have one writing frame and 119 holding frames in a second.

When the first display area DA1 has the writing frame, the first gate signal group G11 to G1N corresponding to the first display area DA1 may be activated. When the first display area DA1 has the holding frame, the first gate signal group G11 to G1N corresponding to the first display area DA1 may be inactivated. For example, the first gate signal group G11 to G1N may be inactivated by a masking method.

When the second display area DA2 has the writing frame, the second gate signal group G21 to G2N corresponding to the second display area DA2 may be activated. When the second display area DA2 has the holding frame, the second gate signal group G21 to G2N corresponding to the second display area DA2 may be inactivated. For example, the second gate signal group G21 to G2N may be inactivated by a masking method.

For example, FIG. 9 represents a first frame. Both of the first display area DA1 and the second display area DA2 may have the writing frames in the first frame in FIG. 9. Thus, the first gate signal group G11 to G1N and the second gate signal group G21 to G2N are activated in the first frame.

For example, FIG. 10 represents a second frame. The first display area DA1 may have the writing frame, and the second display area DA2 may have the holding frame in the second frame in FIG. 10. Thus, the first gate signal group G11 to G1N is activated, and the second gate signal group G21 to G2N is inactivated in the second frame.

According to the present example embodiment, the driving frequencies of the first display area DA1 and the second display area DA2 may be determined based on the folded angle of the first body portion P1 including the first display area DA1 and the second body portion P2 including the second display area DA2. Thus, when it is predicted that the user could not see at least a portion of the first display area DA1 or a portion of the second display area DA2 since the folded angle of the first body portion and the second body portion is small, the predicted area where the user could not see may be driven in a minimum frequency so that the power consumption of the display apparatus may be reduced.

Figure 11:
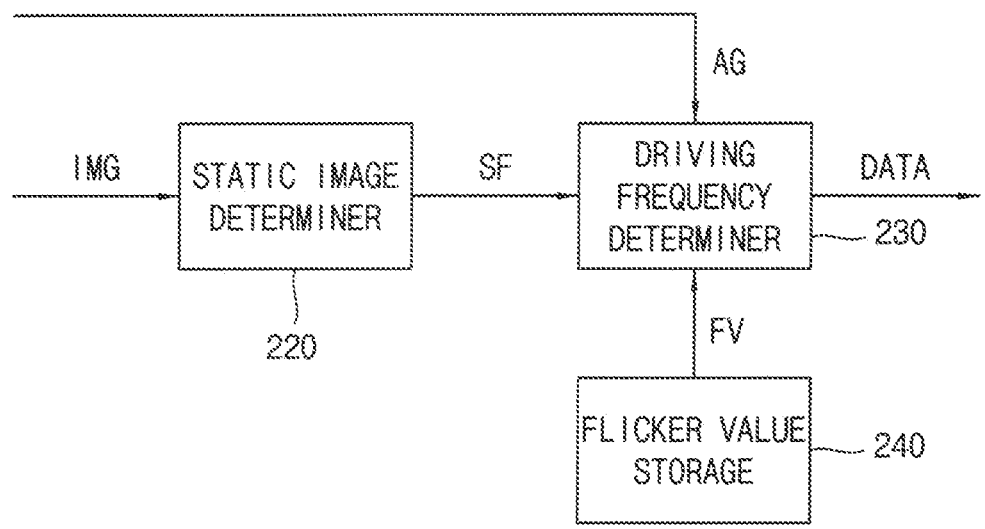
FIG. 11 is a block diagram illustrating a driving controller of a display apparatus according to an example embodiment of the present disclosure.

FIG. 11 is a block diagram illustrating a driving controller 200 of a display apparatus according to an example embodiment of the present disclosure. FIG. 12 is a table illustrating an example of a flicker value storage 240 of FIG. 11.

The flexible display apparatus and the method of driving the display panel using the flexible display apparatus according to the present example embodiment is substantially the same as the flexible display apparatus and the method of driving the display panel using the flexible display apparatus of the previous example embodiment explained referring to FIGS. 1, 2, 3A, 3B, 4, 5, 6, 7, 8, 9 and 10 except for the structure of the driving controller. Thus, the same reference numerals will be used to refer to the same or like parts as those described in the previous example embodiment of FIGS. 1, 2, 3A, 3B, 4, 5, 6, 7, 8, 9 and 10 and any repetitive explanation concerning the above elements will be omitted.

Referring to FIGS. 1, 2, 3A, 3B, 4, 5, 6, 7, 8, 9, 10, 11, and 12, the display apparatus may include a flexible display panel. The display apparatus may be a flexible display apparatus. The display apparatus may be a foldable display apparatus. The display apparatus may be folded along a folding line FL.

The display apparatus includes a display panel 100 and a display panel driver. The display panel driver includes a driving controller 200, a gate driver 300, a gamma reference voltage generator 400 and a data driver 500. The display apparatus may further include a host 600 and a sensor 700.

The driving controller 200 may determine a first driving frequency of the first display area DA1 and a second driving frequency of the second display area DA2 based on the folded angle formed by the first body portion P1 and the second body portion P2.

In the present example embodiment, the driving controller 200 may include a static image determiner 220 and a driving frequency determiner 230.

The static image determiner 220 may determine whether the input image data IMG represent a static image or a moving image. The static image determiner 220 may output a flag SF representing whether the input image data IMG represents the static image or the moving image to the driving frequency determiner 230.

For example, when the input image data IMG represent the static image, the static image determiner 220 may output the flag SF of 1 to the driving frequency determiner 230. When the input image data IMG represent the moving image, the static image determiner 220 may output the flag SF of 0 to the driving frequency determiner 230. When the display panel 100 is operated in always on mode, the static image determiner 220 may output the flag SF of 1 to the driving frequency determiner 230.

For example, the static image determiner 220 may determine whether first input image data corresponding to the first display area DA1 represent a static image or a moving image and whether second input image data corresponding to the second display area DA2 represent a static image or a moving image, respectively.

The driving frequency determiner 230 may determine the first driving frequency and the second driving frequency based on the angle information AG including the folded angle, which is received from the host 600, and whether the input image data IMG represents the static image or the moving image.

The driving controller may further include a flicker value storage 240 including a flicker value FV representing a flicker generating degree according to a grayscale value of the input image data IMG.

The driving frequency determiner 230 may determine the first driving frequency and the second driving frequency based on the folded angle, whether the input image data IMG represents the static image or the moving image and the flicker value FV.

When the flicker value FV of the grayscale value is high since possibility of flicker occurring in the grayscale value of the input image data IMG is high, the driving frequency may be set to be relatively high so that the flicker may be prevented. In contrast, when the flicker value FV of the grayscale value is low since possibility of flicker occurring in the grayscale value of the input image data IMG is low, the driving frequency may be set to be relatively low so that the power consumption may be reduced to prevent the flicker.

For example, when the folded angle is equal to or less than the threshold angle, and the second body portion P2 contacts the ground, the driving frequency determiner 230 may determine the first driving frequency based on whether the first input image data corresponding to the first display area DA1 represent the static image or the moving image and the flicker value FV of the first input image data and the second driving frequency as a predetermined fixed low driving frequency. For example, the predetermined fixed low driving frequency may be set to 1 Hz.

Herein, the second display area DA2 may be the area having low possibility to be seen to the user so that the second driving frequency may be determined as a predetermined fixed low driving frequency.

In contrast, the first display area DA1 may be the area having high possibility to be seen to the user so that the first driving frequency may be determined based on whether the first input image data represent the static image or the moving image and the flicker value FV of the first input image data.

For example, when the first input image data represent the moving image (e.g. SF=0), the driving frequency determiner 230 may drive switching elements of the pixel of the first display area DA1 in a normal driving frequency. The normal driving frequency may be the input frequency of the input image data IMG.

For example, when the first input image data represent the static image (e.g. SF=1), the driving frequency determiner 230 may drive switching elements of the pixel of the first display area DA1 in the low driving frequency.

The driving frequency determiner 230 may refer the flicker value storage 240 to determine the low driving frequency.

In FIG. 12, the input grayscale value of the input image data IMG may be 8 bits, the minimum grayscale value of the input image data IMG may be 0 and the maximum grayscale value of the input image data IMG may be 255. The number of flicker setting stages of the flicker value storage 240 may be 64. When the number of the flicker setting stages increases, the flicker may be effectively removed but a logic size of the driving controller 200 may increase. Thus, the number of the flicker setting stages may be limited.

In FIG. 12, for example, the number of the grayscale values of the input image data IMG is 256 and the number of the flicker setting stages is 64 so that a single flicker value in the flicker value storage 240 may correspond to four grayscale values. For example, a first flicker setting stage stores the flicker value of 0 for the grayscale values of 0 to 3. Herein the flicker value of 0 may represent the driving frequency of 1 Hz. For example, a second flicker setting stage stores the flicker value of 0 for the grayscale values of 4 to 7. Herein the flicker value of 0 may represent the driving frequency of 1 Hz. For example, a third flicker setting stage stores the flicker value of 40 for the grayscale values of 8 to 11. Herein the flicker value of 40 may represent the driving frequency of 2 Hz. For example, a fourth flicker setting stage stores the flicker value of 80 for the grayscale values of 12 to 15. Herein the flicker value of 80 may represent the driving frequency of 5 Hz. For example, a fifth flicker setting stage stores the flicker value of 120 for the grayscale values of 16 to 19. Herein the flicker value of 120 may represent the driving frequency of 10 Hz. For example, a sixth flicker setting stage stores the flicker value of 160 for the grayscale values of 20 to 23. Herein the flicker value of 160 may represent the driving frequency of 30 Hz. For example, a seventh flicker setting stage stores the flicker value of 200 for the grayscale values of 24 to 27. Herein the flicker value of 200 may represent the driving frequency of 60 Hz. For example, a sixty second flicker setting stage stores the flicker value of 0 for the grayscale values of 244 to 247. Herein the flicker value of 0 may represent the driving frequency of 1 Hz. For example, a sixty third flicker setting stage stores the flicker value of 0 for the grayscale values of 248 to 251. Herein the flicker value of 0 may represent the driving frequency of 1 Hz. For example, a sixty fourth flicker setting stage stores the flicker value of 0 for the grayscale values of 252 to 255. Herein the flicker value of 0 may represent the driving frequency of 1 Hz.

For example, when the folded angle is greater than the threshold angle, the driving frequency determiner 230 may determine the first driving frequency based on whether the first input image data represent the static image or the moving image and the flicker value FV of the first input image data and the second driving frequency based on whether the second input image data represent the static image or the moving image and the flicker value FV of the second input image data.

For example, when the first input image data represent the moving image (e.g. SF=0), the driving frequency determiner 230 may drive the switching elements of the pixel of the first display area DA1 in the normal driving frequency.

For example, when the first input image data represent the static image (e.g. SF=1), the driving frequency determiner 230 may drive the switching elements of the pixel of the first display area DA1 in the low driving frequency.

For example, when the second input image data represent the moving image (e.g. SF=0), the driving frequency determiner 230 may drive the switching elements of the pixel of the second display area DA2 in the normal driving frequency.

For example, when the second input image data represent the static image (e.g. SF=1), the driving frequency determiner 230 may drive the switching elements of the pixel of the second display area DA2 in the low driving frequency.

According to the present example embodiment, the driving frequencies of the first display area DA1 and the second display area DA2 may be determined based on the folded angle of the first body portion P1 including the first display area DA1 and the second body portion P2 including the second display area DA2. Thus, when it is predicted that the user could not see at least a portion of the first display area DA1 or a portion of the second display area DA2 since the folded angle of the first body portion and the second body portion is small, the predicted area where the user could not see may be driven in a minimum frequency so that the power consumption of the display apparatus may be reduced.

In addition, a driving frequency of a predicted area where the user could see may be determined using whether the display area displays a static image or a moving image and a flicker value of the image on the display panel 100 so that the power consumption of the display apparatus may be reduced, and the flicker of the image may be prevented. Thus, the display quality of the display panel 100 may be enhanced.

Figures 13, 14:
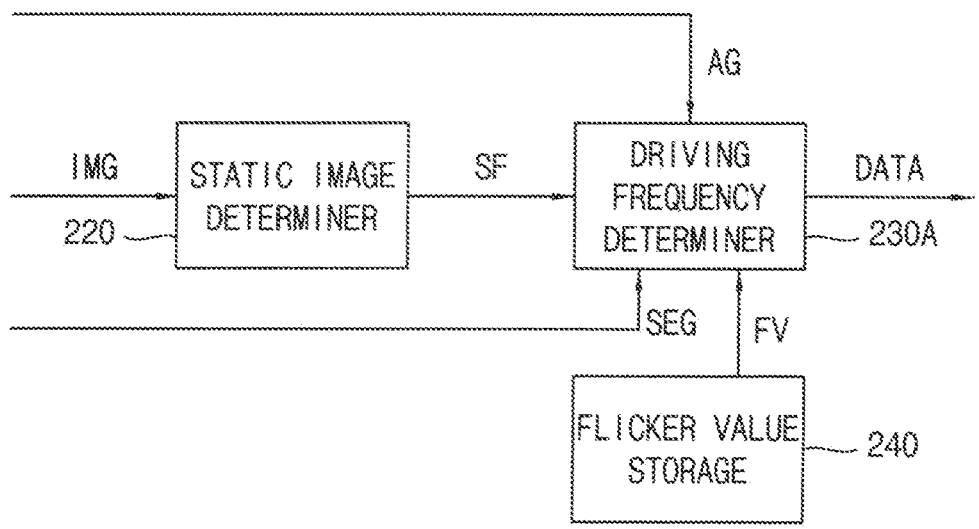
FIG. 13 is a conceptual diagram illustrating a display panel of a display apparatus according to an example embodiment of the present disclosure.
FIG. 14 is a block diagram illustrating a driving controller of the display apparatus of FIG. 13.

FIG. 13 is a conceptual diagram illustrating a display panel of a display apparatus according to an example embodiment of the present disclosure. FIG. 14 is a block diagram illustrating a driving controller of the display apparatus of FIG. 13.

The flexible display apparatus and the method of driving the display panel using the flexible display apparatus according to the present example embodiment is substantially the same as the flexible display apparatus and the method of driving the display panel using the flexible display apparatus of the previous example embodiment explained referring to FIGS. 11 and 12 except that the display panel is divided into a plurality of segments. Thus, the same reference numerals will be used to refer to the same or like parts as those described in the previous example embodiment of FIGS. 11 and 12 and any repetitive explanation concerning the above elements will be omitted.

Referring to FIGS. 1, 2, 3A, 3B, 4, 5, 6, 7, 8, 9, 10, 13, and 14, the display apparatus may include a flexible display panel. The display apparatus may be a flexible display apparatus. The display apparatus may be a foldable display apparatus. The display apparatus may be folded along a folding line FL.

The display apparatus includes a display panel 100 and a display panel driver. The display panel driver includes a driving controller 200, a gate driver 300, a gamma reference voltage generator 400, and a data driver 500. The display apparatus may further include a host 600 and a sensor 700.

In the present example embodiment, the display panel 100 may include a plurality of segments from SEG11 to SEG85. Although the display panel 100 includes the segments in an eight by five matrix in the present example embodiment, the present disclosure is not limited thereto. Herein, the input image data IMG may be also divided into the plurality of the segments from SEG11 to SEG85.

For example, the first display area DA1 may include segments from SEG11 to SEG45 in the first to the fourth rows. The second display area DA2 may include segments from SEG51 to SEG85 in the fifth to the eighth rows.

When the flicker value FV is determined for a unit of the pixel and only one pixel has a high flicker value, the entire display panel 100 may be driven in a high driving frequency to prevent the flicker in only the one pixel. For example, when a flicker of only one pixel is prevented in the driving frequency of 30 Hz and the other pixels do not generate the flicker in the driving frequency of 1 Hz, the display panel 100 may be driven in the driving frequency of 30 Hz, and the power consumption of the display apparatus may be higher than necessary.

Thus, when the display panel 100 is divided into the segments, and the flicker value is determined for a unit of the segment, the power consumption of the display apparatus may be effectively reduced.

In the present example embodiment, the driving controller 200 may include a static image determiner 220 and a driving frequency determiner 230A. The driving controller may further include a flicker value storage 240 including a flicker value FV representing a flicker generating degree according to a grayscale value of the input image data IMG.

The static image determiner 220 may determine whether the input image data IMG represent a static image or a moving image. The static image determiner 220 may output a flag SF representing whether the input image data IMG represents the static image or the moving image to the driving frequency determiner 230A.

The driving frequency determiner 230A may determine the first driving frequency and the second driving frequency based on the angle information AG including the folded angle, which is received from the host 600, and whether the input image data IMG represents the static image or the moving image.

The driving frequency determiner 230A may determine optimal driving frequencies for the segments of the input image data IMG and may determine the maximum driving frequency among the optimal driving frequencies for the segments as the first driving frequency and the second driving frequency.

For example, when an optimal driving frequency for a first segment SEG11 is 10 Hz, and optimal driving frequencies for the other segments from SEG12 to SEG85 except for the first segment SEG11 are 2 Hz, the driving controller 200 may determine the low driving frequency to 10 Hz.

For example, when the folded angle is equal to or less than the threshold angle and the second body portion P2 contacts the ground, the driving frequency determiner 230A may determine the first driving frequency based on whether the first input image data corresponding to the first display area DA1 represent the static image or the moving image, the flicker value FV of the first input image data and segment information SEG of the input image data IMG and the second driving frequency as a predetermined fixed low driving frequency. For example, the predetermined fixed low driving frequency may be set to 1 Hz.

For example, when the folded angle is greater than the threshold angle, the driving frequency determiner 230A may determine the first driving frequency based on whether the first input image data represent the static image or the moving image, the flicker value FV of the first input image data and the segment information SEG of the first input image data and the second driving frequency based on whether the second input image data represent the static image or the moving image, the flicker value FV of the second input image data and the segment information SEG of the second input image data.

According to the present example embodiment, the driving frequencies of the first display area DA1 and the second display area DA2 may be determined based on the folded angle of the first body portion P1 including the first display area DA1 and the second body portion P2 including the second display area DA2. Thus, when it is predicted that the user could not see at least a portion of the first display area DA1 or a portion of the second display area DA2 since the folded angle of the first body portion and the second body portion is small, the predicted area where the user could not see may be driven in a minimum frequency so that the power consumption of the display apparatus may be reduced.

In addition, a driving frequency of a predicted area where the user could see may be determined using whether the display area displays a static image or a moving image and a flicker value of the image on the display panel 100 so that the power consumption of the display apparatus may be reduced and the flicker of the image may be prevented and thus, the display quality of the display panel 100 may be enhanced.

According to the present disclosure as explained above, the power consumption of the display apparatus may be reduced and the display quality of the display panel may be enhanced.

The foregoing is illustrative of the present disclosure and is not to be construed as limiting thereof. Although a few example embodiments of the present disclosure have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific example embodiments disclosed, and that modifications to the disclosed example embodiments, as well as other example embodiments, are intended to be included within the scope of the appended claims. The present disclosure is defined by the following claims, with equivalents of the claims to be included therein.

What is claimed is:

1. A flexible display apparatus comprising:
   a first body portion including a first display area;
   a second body portion including a second display area connected to the first display area; and
   a driving controller connected to at least one of the first body portion and the second body portion and receiving an angle information from a sensor,
   wherein the driving controller includes a flicker value storage including a flicker value representing a flicker generating degree according to a grayscale value of the input image data, and
   wherein the driving controller is configured to determine a first driving frequency of the first display area and a second driving frequency of the second display area based on a folded angle between the first body portion and the second body portion along a folded line disposed between the first body portion and the second body portion and the flicker value.

2. The flexible display apparatus of claim 1, wherein when the folded angle is equal to or less than a threshold angle, the first driving frequency is different from the second driving frequency.

3. The flexible display apparatus of claim 2, wherein the threshold angle is about 90 degrees.

4. The flexible display apparatus of claim 1, wherein when the folded angle is equal to or less than a threshold angle, and the second body portion contacts a ground, the first driving frequency is an input frequency of input image data, and the second driving frequency is a low driving frequency less than the input frequency.

5. The flexible display apparatus of claim 1, wherein when the folded angle is greater than a threshold angle, the first driving frequency is equal to the second driving frequency.

6. The flexible display apparatus of claim 1, wherein when the folded angle is greater than a threshold angle, the first driving frequency and the second driving frequency are an input frequency of input image data.

7. The flexible display apparatus of claim 1, wherein the driving controller:
   is configured to determine whether input image data represents a static image or a moving image,
   configured to determine the first driving frequency and the second driving frequency based on the folded angle, and configured to determine whether the input image data represents the static image or the moving image.

8. The flexible display apparatus of claim 7,
   wherein the driving controller is configured to determine the first driving frequency and the second driving frequency based on the folded angle, the flicker value, and whether the input image data represents the static image or the moving image.

9. The flexible display apparatus of claim 8, wherein the input image data is divided into a plurality of segments, and
   wherein the driving controller is configured to determine the first driving frequency and the second driving frequency based on the folded angle, whether the input image data represents the static image or the moving image, the flicker value, and a segment information of the input image data.

10. The flexible display apparatus of claim 9, wherein the driving controller is configured to determine optimal driving frequencies for the segments of the input image data, and
    wherein the driving controller is configured to determine the first driving frequency and the second driving frequency based on a maximum driving frequency among the optimal driving frequencies for the segments.

11. The flexible display apparatus of claim 8, wherein when the folded angle is equal to or less than a threshold angle, and the second body portion contacts the ground, the driving controller is configured to determine the first driving frequency based on whether a first input image data corresponding to the first display area represents the static image or the moving image and the flicker value of the first input image data and the second driving frequency as a predetermined low driving frequency.

12. The flexible display apparatus of claim 8, wherein when the folded angle is greater than a threshold angle, the driving controller is configured to determine the first driving frequency based on whether first input image data corresponding to the first display area represent the static image or the moving image and the flicker value of the first input image data and the second driving frequency based on whether second input image data corresponding to the second display area represent the static image or the moving image and the flicker value of the second input image data.

13. The flexible display apparatus of claim 1, wherein the sensor is electrically connected to the driving controller and sends the angle information and configured to determine the folded angle between the first body portion and the second body portion and to determine whether the first body portion is disposed closer to a ground than the second body portion, or the second body portion is disposed closer to the ground than the first body portion.

14. The flexible display apparatus of claim 13, further comprising a host configured to receive the folded angle and a proximity information representing whether the first body portion is closer to the ground than the second body portion, or the second body portion is closer to the ground than the first body portion from the sensor and configured to transmit the folded angle and the proximity information to the driving controller.

15. A method of driving a display panel, the method comprising steps of:
- determining a first driving frequency of a first display area and a second driving frequency of a second display area based on a folded angle of a first body portion including the first display area and a second body portion including the second display area connected to the first display area by a driving controller;
- displaying a first image on the first display area in the first driving frequency; and
- displaying a second image on the second display area in the second driving frequency,
- wherein the driving controller includes a flicker value storage including a flicker value representing a flicker generating degree according to a grayscale value of the input image data, and
- wherein the driving controller is configured to determine the first driving frequency and the second driving frequency based on the folded angle and the flicker value.

16. The method of claim 15, wherein, when the folded angle is equal to or less than a threshold angle, the first driving frequency is different from the second driving frequency.

17. The method of claim 16, wherein the threshold angle is about 90 degrees.

18. The method of claim 15, wherein, when the folded angle is equal to or less than a threshold angle, and the second body portion contacts a ground, the first driving frequency is an input frequency of input image data, and the second driving frequency is a low driving frequency less than the input frequency.

19. The method of claim 15, wherein, when the folded angle is greater than a threshold angle, the first driving frequency is equal to the second driving frequency.

20. The method of claim 15, wherein, when the folded angle is greater than a threshold angle, the first driving frequency and the second driving frequency are an input frequency of input image data.

* * * * *